United States Patent Office 3,488,749
Patented Jan. 6, 1970

3,488,749
ANTIDEPRESSANT N,N-DIMETHYLCINNAMAMIDE COMPOSITIONS AND METHODS
Bernard Loev, Broomall, and Edward Macko, Philadelphia, Pa., assignors to Smith Kline & French Laboratories, Philadelphia, Pa., a corporation of Pennsylvania
No Drawing. Filed Jan. 29, 1968, Ser. No. 701,087
Int. Cl. A61k 27/00
U.S. Cl. 424—324          15 Claims

ABSTRACT OF THE DISCLOSURE

Certain trans - N,N - dimethylcinnamamide congeners have novel antidepressant activities. Pharmaceutical compositions and methods of inducing antidepressant activity are described using these active ingredients. The compounds, all having the basic trans-N,N-dimethylcinnamamide structure, are prepared by condensing an appropriate benzaldehyde with malonic acid to give a phenylacrylic acid, forming the acrylyl chloride with thionyl chloride and condensing same with dimethylamine.

---

This application is a continuation-in-part of our copending application Ser. No. 548,871, filed May 10, 1966 and now abandoned.

This invention comprises pharmaceutical compositions containing various N,N-dimethylcinnamamides having novel antidepressant activity and methods for producing antidepressant activity.

The compositions of this invention are dosage unit forms such as a capsule, tablet, pharmaceutical suspension, sterile solution, troche, etc. containing a therapeutically effective amount of a trans-N,N-dimethylcinnamamide having, for example, the following formula:

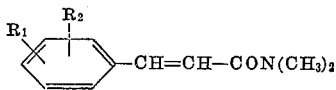

I in which:

$R_1$ is hydrogen, halo such as fluoro, chloro or bromo, trifluoromethyl, lower alkyl of 1–3 carbon atoms, nitro, dimethylsulfamyl, lower alkoxy of 1–3 carbon atoms, methylsulfonyl, trifluoromethylsulfonyl, trifluoromethylthio or lower alkylthio of 1–3 carbon atoms; and $R_2$ is hydrogen, halo, trifluoromethyl or lower alkyl of 1–3 carbon atoms, preferably hydrogen.

The preferred compounds are those of Formula I in which $R_1$ is hydrogen, halo, trifluoromethyl, lower alkyl or lower alkoxy and $R_2$ is hydrogen.

A few of the chemical constituents described above are known in the prior art. For example, N,N-dimethylcinnamamide, the parent compound of Formula I when $R_1$–$R_2$ is hydrogen, is an old compound reported in the literature in 1899 (see Beilstein 9 587, I 233). In 1950, weak analegetic activity was described for various cinnamamides unsubstituted in the phenyl ring with activity increasing as the chain length of the N,N-dialkyl substituents increased. The most active one was reported to be the N-diethyl congener which was reported to be less active than is aspirin [J. Am. Chem. Soc. 72, 3885 (1950)].

The nub of the present invention, namely finding a novel antidepressant activity at an unexpectedly low dose level without overt pharmacological effects, is unexpectedly characterized by the essential N,N-dimethylcinnamamide fraction,

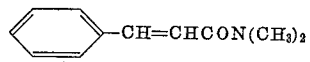

The primary cinnamamide, the diethylamide, the monomethylamide and the dimethylthioamide congeners all have very little or no antidepressant activity.

Also a part of this invention are certain new compounds of Formula I not previously reported in the art which have a strongly electronegative but small sized organic group at the para position such as

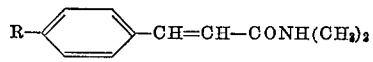

II in which R is trifluoromethyl or halo such as chloro, fluoro or bromo. Halo substituents at the 4 or para position of N,N-dimethylcinnamamide have unexpectedly been found to give enhanced antidepressant activity of 2–3 fold over the parent compound. Substituting the same group at the ortho or meta positions decreases the activity of the parent compound.

These new 4-halo compounds are therefore of particular interest in that their enhanced potency gives them the advantage of being used in various sustained release dosage unit forms, such as those described in U.S. Patents 2,738,303, 2,951,792, 2,793,979 or 3,108,046. The preferred compound is trans-N,N-dimethyl-4-chlorocinnamamide.

Another surprising aspect of this invention is the fact that the trans isomers possess much more pronounced biological activity than do the cis isomers and are thus a preferred aspect of this invention. Additionally, the trans isomers are solids where the cis isomers are usually liquids.

The novel activity which is the basis of this invention is antidepressant activity without the overt effects usually seen with antidepressants. The activity resembles that induced by monoamine oxidase inhibitors but it has clearly been shown not to be due to this mechanism since the compositions have no in vitro MAOI activity. Also the activity does not resemble that of the pure stimulants such as amphetamine since the compositions involved do not reverse ptosis as does amphetamine. The compositions of this invention also have been found to elevate catechol amine levels of the brain, a unique biological property. It is generally accepted that a decrease of brain amine level may be the cause of depression. This aspect of this invention indicates the compositions and methods of this invention can be used either to prevent or treat depressive states.

The novel antidepressant activity is demonstrated by the standard test employing the prevention of reserpine-induced ptosis in mice as disclosed by Costa E. et al., Experientia 16, 461–463 (1960) and Sulser F. et al., Fed, Proc. 19, 268 (1960). Groups of 10 $CF_1$ male mice weighing 18–30 gms. were used, one group as control. Oral doses of 25, 50 and 75 mg./kg. suspended in tragacanth solution were administered each to a group of mice followed at various time intervals by 1 mg./kg. of reserpine I.V. with observation for prevention of the ptosis effect for 45 minutes after dosage.

In this standard test N,N-dimethylcinnamamide had an $ED_{50}$ of 49 mg./kg. with the following specific data:

| Dose | Time | Animals | Percent showing prevention |
|---|---|---|---|
| 25 | 60 | 10 | 20 |
| 25 | 180 | 10 | 10 |
| 50 | 60 | 10 | [1] 50 |
| 75 | 60 | 10 | 70 |
| Controls | | 30 | 0 |

[1] No side effects.

4-chloro-N,N-dimethylcinnamamide in this same test had an $ED_{50}$ of 15 mg./kg. with the following specific data:

| Dose | Time | Animals | Percent showing prevention |
|------|------|---------|---------------------------|
| 12.5 | 60 | 10 | 30 |
| 18 | 60 | 10 | 70 |
| 25 | 60 | 10 | [1] 80 |
| 25 | 180 | 10 | 20 |
| Controls | | 10 | 0 |

[1] No side effects.

In the same test the standard antidepressant drugs amitriptyline and imipramine had $ED_{50}$'s of 15.5 mg./kg. and 10.5 mg./kg. respectively in mice. In the same test in rats, N,N-dimethyl-4-methoxycinnamamide has an $ED_{50}$ of 50 mg./kg.

The claimed compositions also exhibit some anticonvulsant activity. For example, dimethylcinnamamide has an $ED_{50}$ of 150 mg./kg. in the standard electroshock test in which diphenylhydantoin sodium has an $ED_{50}$ of 11 mg./kg. The compositions of this invention also have no significant overt effects up to 300 mg./kg. nor any tranquilizing activity in standard tests. They also do not reverse the ptosis caused by reserpine as do the overall stimulants such as amphetamine.

Therefore the method of this invention for producing antidepressants effects or preventing depression comprises administering internally either parenterally or preferably orally to the host animal, an antidepressant but nontoxic dose of a compound of the structure of Formulas I or II above. The daily rose range of active base compound may be for example from about 10–300 mg. depending on the condition being treated and the potency of the individual compound used.

The pharmaceutical compositions of this invention comprise an active compound as described above in a dosage unit form such as a tablet, capsule, suspension, sterile solution or suspension, troche, wafer, etc. Standard pharmaceutical carriers may be present such as lactose, magnesium stearate, terra alba, sucrose, talc, stearic acid or its glycol esters, gelatin, agar pectin, or acacia, peanut oil, hydrogenated castor oil, olive oil, sesame oil or water.

The pharmaceutical dosage units are prepared by standard methods such as by mixing with a carrier and filled into a hard gelatin capsule, by granulating and tableting, by suspending a micronized powder in a suitable sterile parenteral vehicle or by suspending in a water base with a thickening agent such as carboxymethylcellulose for an oral liquid product. The dosage units will contain sufficient active compound to have effective antidepressant activity but still not show limiting toxic side effects. A dose range of from about 10–250 mg. has antidepressant activity without an analgetic effect. The latter effect when present, as stated in the art for N,N-dimethylcinnamamide, is appreciable only at well over the dosage of aspirin, 300 mg. or 5 grains. Such dosage units are administered internally from 1–6 times daily.

One skilled in the art will recognize that for calculating the amounts of active ingredients in the claimed dosage unit compositions it is often convenient to use mg./kg. amounts depending on the activity of the chemical ingredient as well as the size and pharmacology of the host animal. In such claimed compositions the active chemical will be present in about 0.25–50 mg./kg. preferably about 0.50–25 mg./kg. amounts.

While the parent compound for which this novel activity has been discovered is a known compound as described above, very few other dimethylcinnamamides have been described previously to our knowledge. The chemical preparation of these compounds is easily accomplished. For example, the phenylacrylic acid is converted to its acyl halide by reaction with a standard halo ester such as thionyl chloride, thionyl bromide, phosphorus pentachloride, phosphorus trichloride or phosphorus oxychloride. The resulting phenylacrylyl halide is then reacted with an excess of dimethyl amine, for example in aqueous amine solution or in an organic solvent such as chloroform with the gaseous amine. Alternatively, a mixed ester or anhydride of the acrylic acid can be formed such as with ethyl chlorocarbonate followed by reaction with dimethylamine. Alternatively, an ester of the acrylic acid preferably the methyl or ethyl ester may be converted to the amide by heating with aqueous or anhydrous dimethylamine. These compounds may also be made by heating the dimethylamine salt of the acid with eliminatiton of water.

The acrylic acid starting materials are widely known but are most easily prepared by condensing the desired benzaldehyde or ketone with a malonic acid in the presence of acid or basic catalysts with heating as described in the examples. They may also be prepared by condensing the appropriate aldehyde or ketone with a lower alkyl acetate or propionate giving the corresponding cinnamic ester which is converted directly with dimethylamide, or via the acid, to the amide.

In a like manner, condensation may be carried out with acetic or propionic anhydride or sodium salt to give the cinnamic acid.

The description herein and in the following examples is to the preferred trans isomers.

The description above and the following examples are designed to explain the operation of this invention fully but not to limit the invention. Certain equivalent compounds will be apparent to those skilled in the art, for example, pyridyl, thienyl or furyl acrylamides rather than the phenylacrylamides described in detail herein. Such are considered within the ambit of this invention.

EXAMPLE 1

A phenylacrylic acid (0.28 mole) in 175 ml. of thionyl chloride is heated at reflux for two hours then the mixture is concentrated in vacuo. The crude halide residue is taken up in an organic solvent such as in 50 ml. of ether and added with stirring to 60 ml. of 25% aqueous dimethylamine at 10–20° C. The mixture is stirred for an hour, heated under vacuum to remove the volatiles and chilled. The product usually crystallizes directly or is extracted with ether then crystallized by concentration and cooling to give the desired N,N-dimethylcinnamamide.

The acrylic acid starting material is prepared by heating a mixture of 2.8 moles of the benzaldehyde, 606 g. of the malonic acid, 1170 ml. of pyridine and 23 ml. of piperidine on the steam bath for 1½ hours then at reflux for 15 minutes. Dilute hydrochloric acid is added to the cooled mixture. The product is separated by filtration.

EXAMPLE 2

Hard gelatin capsule products are prepared by mixing the active dimethylacrylamide with sufficient lactose to make up to 300 mg. plus 2 mg. of magnesium stearate. The mixture is screened, mixed and filled into a hard gelatin capsule.

Tablet dosage unit compositions of this invention are prepared by mixing sucrose (25 mg.), calcium sulfate dihydrate (150 mg.), and the dimethylcinnamamide (25 mg.;) thoroughly then followed by granulating the mixture using 10% gelatin solution. The mixture is screened, dried and rescreened then mixed with starch (15 mg.), talc (5 mg.) and stearic acid (3 mg.) prior to compression into a tablet.

EXAMPLE 3

N,N-dimethylcinnamamide (M.P. 98° C.) prepared as in Example 1 is mixed in a 50 mg. aliquot with 250 mg. of sucrose and a lubricating agent then filled into a capsule. From 3–5 of these capsules are administered daily orally to a subject with a potential for depression to produce antidepressant activity.

4-chloro-N,N-dimethylcinnamamide (M.P. 122–124° C.) is prepared as in Example 1 but using 4-chlorobenzaldehyde. The acrylic acid intermediate melts at 241–246° C. The cinnamamide compound, 25 mg., is tableted as described in Example 2 to give 25 mg. tablets which are administered orally from 2–5 times daily.

4 - trifluoromethyl - N,N-dimethylcinnamamide (M.P. 109° C.) is prepared as in Example 1 using 4-trifluoromethylbenzaldehyde. The compound (100 mg.) is coated on sugar seeds then covered with glyceryl monostearate in a coating pan and filled into a capsule two of which are administered twice daily.

Using 3-chlorobenzaldehyde gives 3-chloro-N,N-dimethylcinnamamide (M.P. 90° C.) which is very much less active than is its para isomer.

Using 2-chlorobenzaldehyde gives 2-chloro-N,N-dimethylcinnamamide (M.P. 94° C.) also much less active than the 4-isomer.

Using either 4-trifluoromethylthio or 4-trifluoromethylsulfonylbenzaldehyde (U.S. Patent No. 3,061,645) in the process of Example 1, 4-trifluoromethylthio or 4-trifluoromethylsulfonyl-N,N-dimethylcinnamamide are obtained.

EXAMPLE 4

Using 3,4-dichlorobenzaldehyde in the chemical process of claim 1 gives 3,4-dichloro-N,N-dimethylcinnamamide which is formulated and administered internally to the host animal as described. Using 4-chloro-2-nitrobenzaldehyde gives 4 - chloro-2-nitro-N,N-dimethylcinnamamide. 4-fluorobenzaldehyde gives 4-fluoro-N,N-dimethylcinnamamide. 2,4-dibromobenzaldehyde gives 2,4-dibromo-N,N-dimethylcinnamamide. Using 4-dimethylsulfamylbenzaldehyde gives 4-dimethylsulfamyl-N,N-dimethylcinnamamide. Using 3-methylsulfonylbenzaldehyde gives 3-methylsulfonyl-N,N-dimethylcinnamamide. Using 4-methoxybenzaldehyde gives 4-methoxy-N,N,-dimethylcinnamamide, M.P. 90–95° C.

All of these compounds are prepared, formulated and used as disclosed hereabove.

What is claimed is:

1. A pharmaceutical dosage unit composition for producing antidepressant activity and in the form of a capsule, tablet, troche or sterile parenteral preparation containing an effective but nontoxic amount of a compound within the dose range of about 10–250 mg., said compound having the transconfiguration and the formula:

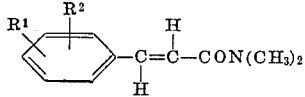

in which $R_1$ is hydrogen, halo, trifluoromethyl, lower alkyl of 1–3 carbon atoms, nitro, dimethylsulfamyl, lower alkoxy of 1–3 carbon atoms, methylsulfonyl, trifluoromethylsulfonyl, trifluoromethylthio, or alkylthio of 1–3 carbon atoms and $R_2$ is hydrogen, halo, trifluoromethyl or lower alkyl of 1–3 carbon atoms and a pharmaceutical carrier therefor.

2. The composition of claim 1 in which the dosage unit form contains from about 0.25–50 mg./kg. of the compound, said mg./kg. being the amount of compound in milligrams calculated on the body weight of the host animal in kilograms.

3. The method of producing antidepressant activity in a depressed host animal comprising administering internally to said host animal a nontoxic but effective quantity of a compound having the formula in claim 1.

4. The method of preventing depression in a host animal subject to depression comprising administering orally to said host animal from 1–6 times daily a dosage unit as claimed in claim 1.

5. The composition of claim 1 which the compound is trans-N,N-dimethylcinnamamide.

6. A pharmaceutical dosage unit composition for producing antidepressant activity in the form of a capsule, tablet, troche, suspension or sterile parenteral preparation containing an effective but nontoxic amount of 4-chloro-N,N-dimethylcinnamamide and a pharaceutical carrier therefor.

7. The composition of claim 6 in which the dosage unit contains from about 0.25–50 mg./kg. of compound.

8. The composition of claim 6 in which the dosage unit contains from about 10–250 mg.

9. A pharmaceutical dosage unit composition for producing antidepressant activity in the form of a capsule, tablet, troche, suspension or sterile parenteral preparation containing an effective but nontoxic amount of trans-4-trifluoromethyl-N,N-dimethylcinnamamide and a pharmaceutical carrier therefor.

10. The method of producing antidepressant activity in a depressed host animal comprising administering internally to said host animal a nontoxic but effective quantity of trans-4-chloro-N,N-dimethylcinnamamide, trans - 4 - trifluoromethyl-N,N-dimethylcinnamamide or trans-N,N-dimethylcinnamamide.

11. The method of claim 10 in which the compound is administered orally in a daily dose of from about 10–300 mg.

12. The method of claim 10 in which the compound in trans-4-chloro-N,N-dimethylcinnamamide and the daily dose is from about 10–150 mg.

13. The method of preventing depression in a host animal subject to depression comprising administering orally to said host animal an effective but nontoxic quantity of trans-4-cloro-N,N-dimethylcinnamamide, trans-N,N-dimethylcinnamamide or trans-4-trifluoromethyl-N,N-dimethylcinnamamide.

14. The method of claim 13 in which the administration is orally in the form of a pharmaceutical dosage unit composition from 1–6 times daily.

15. The method of claim 13 in which the compound is trans-4-chloro-N,N-dimethylcinnamamide.

References Cited

J.A.C.S., 72, pp. 3885–3886 (1950).

ALBERT T. MEYERS, Primary Examiner

S. J. FRIEDMAN, Assistant Examiner

U.S. Cl. X.R.

260—558